Jan. 6, 1925.
G. W. BOWER
1,522,173
CURVE SUSPENSION FOR TROLLEY WIRES
Filed April 6, 1923
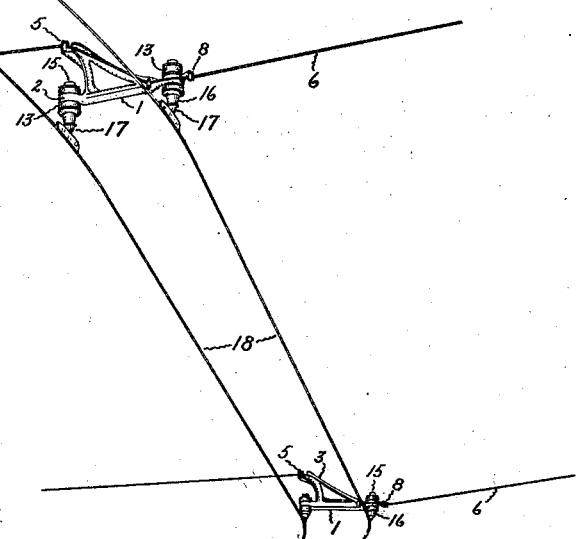
Fig. 1.
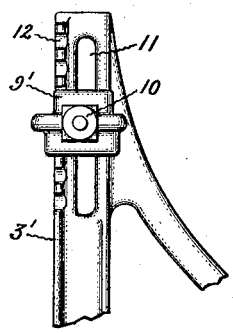
Fig. 3.
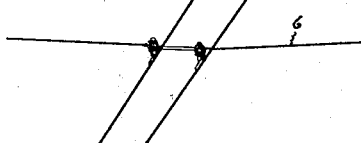
Fig. 2.
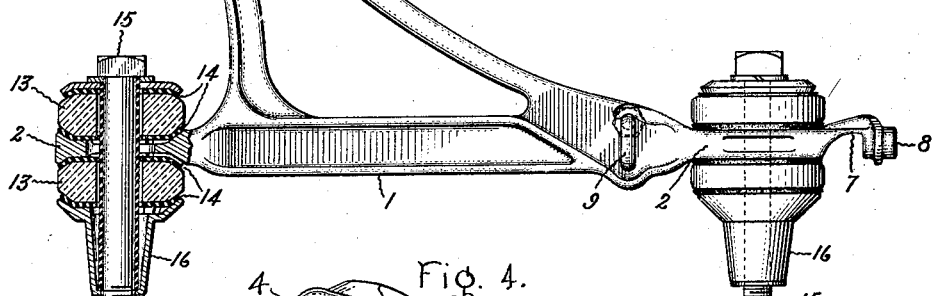
Fig. 4.
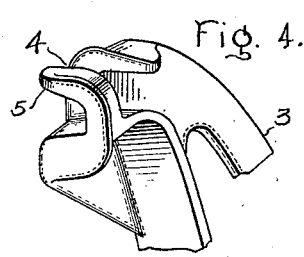
Inventor:
George W. Bower,
by
His Attorney.

Patented Jan. 6, 1925.

1,522,173

UNITED STATES PATENT OFFICE.

GEORGE W. BOWER, OF SCHENECTADY, NEW YORK, ASSIGNOR TO GENERAL ELECTRIC COMPANY, A CORPORATION OF NEW YORK.

CURVE SUSPENSION FOR TROLLEY WIRES.

Application filed April 6, 1923. Serial No. 630,340.

*To all whom it may concern:*

Be it known that I, GEORGE W. BOWER, a citizen of the United States, residing at Schenectady, in the county of Schenectady, State of New York, have invented certain new and useful Improvements in Curve Suspensions for Trolley Wires, of which the following is a specification.

The present invention relates to electric street railways and more especially to supporting of the overhead trolley wires.

Electric current for street car propulsion is ordinarily supplied by a single trolley wire from which it is collected by a trolley wheel or shoe carried by the car and after having done its work in the motor escapes to ground through the car wheels and track. In the propulsion of a car on streets without tracks, it is the practice to provide two overhead trolley wires spaced a foot or more apart, one for high potential current and the other for low potential current, and the car is provided with two electrically independent current collectors carried upon a crosshead of a single spring actuated pole operating to maintain the current collectors pressed against the under side of the respective trolley wires as the car moves along the street beneath them.

On account of the less confined paths of movement of a trackless trolley car and the consequent greater tendency for its collector head to become displaced, it is highly important that the pair of trolley wires be accurately suspended and maintained in the same working plane at corresponding points throughout the course of travel of the car. It is also highly important that the supporting and staying means for the trolley wires be located well out of the range of movement of the collector head.

The matter of supporting and staying a double trolley line in proper position on tangents presents no special difficulty, but where such trolley line departs from a straight course, it is necessary to pull it over by tensioning the portions of the span wires on the outside of the curve greatly in excess of the portions inside the curve. Moreover, the span wires have to be kept well above the plane of the trolley wires in order to escape conflict with the collector head as it travels along the latter wires.

The object of my invention is to provide an improved curve suspension for double trolley wire systems whereby the conductor wires may be properly positioned and supported below the plane of the span wires and irrespective of the difference in tension exerted by the opposite portions of the span wire thereon.

One embodiment of the invention is shown in the accompanying drawing in which Fig. 1 is an under side perspective view of a curved portion of a double overhead trolley line with two of my curve suspensions shown in operative relation thereto; Fig. 2 is an enlarged side elevation of the curve suspension with one of the insulators shown in vertical section, Fig. 3 shows a modified form of bracket extension, and Fig. 4 is a perspective view of part of the suspension shown in Fig. 2.

The curve suspension shown consists of a metal casting having a horizontal supporting beam member 1 provided at each end with a circular seat 2, and extend upwardly from the inner or left-hand end of the beam member 1 is an arm 3 having at its free end a notch 4 and a U-shaped finger 5 (see Fig. 4) for embracing the span wires 6. A similar notch 7 and finger 8 are provided at the outer or right-hand end of the beam member and a wire clamp 9 extends through the beam in the vicinity of the outer seat 2.

The bracket extension 3′, shown in Fig. 3, is provided with an adjustable clamp plate 9′ having a bolt 10 carried in a vertical slot 11 and adapted to grip a span wire 6 positioned in any one of the notches 12 formed in the side of the bracket extension.

The circular seats 2 are adapted to receive the insulators for the trolley wires which consist of two porcelain washers 13 disposed on opposite sides of the seat with fibre or other cushioning material 14 between the porcelain and the metal parts. A bolt 15 passes axially through the insulators and spacer bells 16 and engage at their lower ends with the usual ears 17 secured to the trolley wire 18.

In erecting a double trolley wire system at the curved portions thereof, the span wires 6 will be engaged with the curve suspensions, as shown in Figs. 1 and 2, by looping through the holding fingers 5 and 8 with the higher finger 5 toward the center of the curve. The trolley wire 17 will then be engaged by the insulator bolts 15 and the suspension and parts carried thereby will be forced one way or the other along the span wire 6 and secured in adjusted position by tightening up the clamp 9. By reason of greater stress exerted by the portion of the span wire on the outside of the curve, its leverage or distance above the horizontal plane of the trolley wires is made correspondingly less than the arm through which the other portion of the span wire acts inside the curve. It is accordingly practical to bring and retain both trolley wires into the same horizontal plane by merely adjusting the tension on the inner portion of the span wire 6. Where it is found to be more convenient to accomplish this adjustment by varying the relative lengths of the arms through which the respective portions of a span wire exert their stresses, a suspension with a bracket extension constructed as shown in Fig. 3 may be employed.

While I have shown and described the best embodiment of the invention known to me, I do not desire to be restricted thereto.

What I claim as new and desire to secure by Letters Patent of the United States, is:

1. A curve suspension for double trolley wires having a member provided with spaced seats for insulated bolts, an arm extending above said seat member, and span wire engaging means located on said arm and on one end of said seat member.

2. A curve suspension for double trolley wires having a member provided with spaced seats for insulated bolts, an arm thereon extending above said seats, span wire engaging notches located on said arm and on one end of said seat member, and means for clamping a span wire to said suspension.

3. A curve suspension for trolley double wires having a member provided with spaced seats for insulated bolts, an arm extending above said seats and provided with a clamp for holding a span wire in adjusted position thereon, and means at one end of said seat member for engaging a span wire.

In witness whereof, I have hereunto set my hand this 5th day of April, 1923.

GEORGE W. BOWER.